United States Patent
Abadallah et al.

(10) Patent No.: US 7,249,243 B2
(45) Date of Patent: Jul. 24, 2007

(54) CONTROL WORD PREDICTION AND VARYING RECOVERY UPON COMPARING ACTUAL TO SET OF STORED WORDS

(75) Inventors: Mohammad A. Abadallah, Folsom, CA (US); Mitchell Diamond, Folsom, CA (US); David B. Jackson, Folsom, CA (US); Kip A. Baumann, Folsom, CA (US); Ki W. Yoon, Folsom, CA (US); Rafi M. Saied, Folsom, CA (US); Robert L. Farrell, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 357 days.

(21) Appl. No.: 10/636,146

(22) Filed: Aug. 6, 2003

(65) Prior Publication Data

US 2005/0033946 A1 Feb. 10, 2005

(51) Int. Cl.
*G06F 9/38* (2006.01)
(52) U.S. Cl. .................................. 712/221; 712/23
(58) Field of Classification Search .................. None
See application file for complete search history.

(56) References Cited

U.S. PATENT DOCUMENTS

| 6,622,241 B1* | 9/2003 | Brockmann et al. ........ 712/240 |
| 6,779,103 B1* | 8/2004 | Alexander, III et al. .... 712/217 |
| 2004/0193855 A1* | 9/2004 | Kacevas et al. ............ 712/237 |

* cited by examiner

*Primary Examiner*—Kenneth S. Kim
(74) *Attorney, Agent, or Firm*—Blakely, Sokoloff, Taylor & Zafman LLP

(57) ABSTRACT

Techniques for control word prediction and speculative execution. In one embodiment, an apparatus includes a control word predictor, execution resources, and a comparison module. The control word predictor of this embodiment predicts a predicted control word for execution of operations in response to a control word changing operation. The execution resources of this embodiment speculatively execute the plurality of operations utilizing the predicted control word, and the comparison module determines if the predicted control word matches an actual control word set by the control word changing operation or a plurality of other control words, and to cause re-execution of said plurality of operations if said actual control word matches any of the plurality of other control words.

26 Claims, 6 Drawing Sheets

CONTROL WORD PREDICTION AND VARYING RECOVERY UPON COMPARING ACTUAL TO SET OF STORED WORDS

BACKGROUND

1. Field

The present disclosure pertains to the field of processing apparatuses and systems that process sequences of instructions, operations, or the like. Various embodiments relate to prediction techniques that may be used for control registers in such a processing apparatus or system.

2. Description of Related Art

Information processing devices that process sequences of instructions or operations are often slowed by various dependencies. A dependency is simply when one operation depends on a result or an effect of a prior operation, thereby forcing a degree of ordering to obtain correct execution. Techniques which expedite processing of sequences of instructions with dependencies may advantageously improve overall processing rates, and therefore be desirable.

One type of dependency is a data dependency. For example, an arithmetic operation may use the result of a prior arithmetic operation. One technique commonly used to address this situation is register renaming. Register renaming allows different physical registers to represent a single logical register at different points in time. Therefore, multiple operations that use a single register need not completely stall while waiting for that register to be available. At some point, the register value from the prior operation needs to be forwarded to the subsequent operation. However, in a pipelined machine, allowing the subsequent operation to proceed through various pipeline stages using a renamed register can substantially expedite processing over the alternative of waiting for the actual register to be available.

Another type of dependency is a control dependency. Many processing devices include various control words or control registers. When a value is loaded into such control words, the processing device may perform operations in a different manner. For example, a control word may control privilege level, whether various functions are enabled, how rounding is performed, what level of precision to use, etc.

One prior art reference discusses the use of renaming for control words (e.g., patent application Ser. No. 09/676,550, entitled "Floating Point Control Word Register Renaming", assigned to the assignee of the present application). A processor using such control word renaming decodes a FLDCW instruction into a sequence of operations. In particular, when a FLDCW instruction is encountered, it is predicted that the control word will flip between two values, and instructions subsequent to the prediction may be colored or tagged differently so their speculative execution can be flushed in the event of a misprediction. In such a processor, a test microoperation (uOP) is generated in response to the load floating point control word instruction to test this prediction. If a match occurs to the predicted value, then the flow concludes. If a mismatch to the predicted value occurs, then a serialization flow is needed. Further techniques to expedite control word changing operations may be desirable.

BRIEF DESCRIPTION OF THE FIGURES

The present invention is illustrated by way of example and not limitation in the Figures of the accompanying drawings.

FIG. 4 illustrates one embodiment of a method associated with the processor of FIG. 3a.

DETAILED DESCRIPTION

The following description describes embodiments of virtual prediction for control registers in a speculatively executing machine. In the following description, numerous specific details such as processor types, control register or word types, arrangements/interconnections of various functional blocks, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

In some embodiments, disclosed techniques may provide front end prediction of a control word, allowing speculative execution of programmatically subsequent operations. The actual control word may be compared not only to the predicted control word, but also to other stored control words. If a match or a virtual match is encountered, then no penalty (for a match) or a branch misprediction penalty (for a virtual match) may be incurred in some embodiments. On the other hand, if no virtual match occurs, a serializing flow may be followed.

Figure 1:
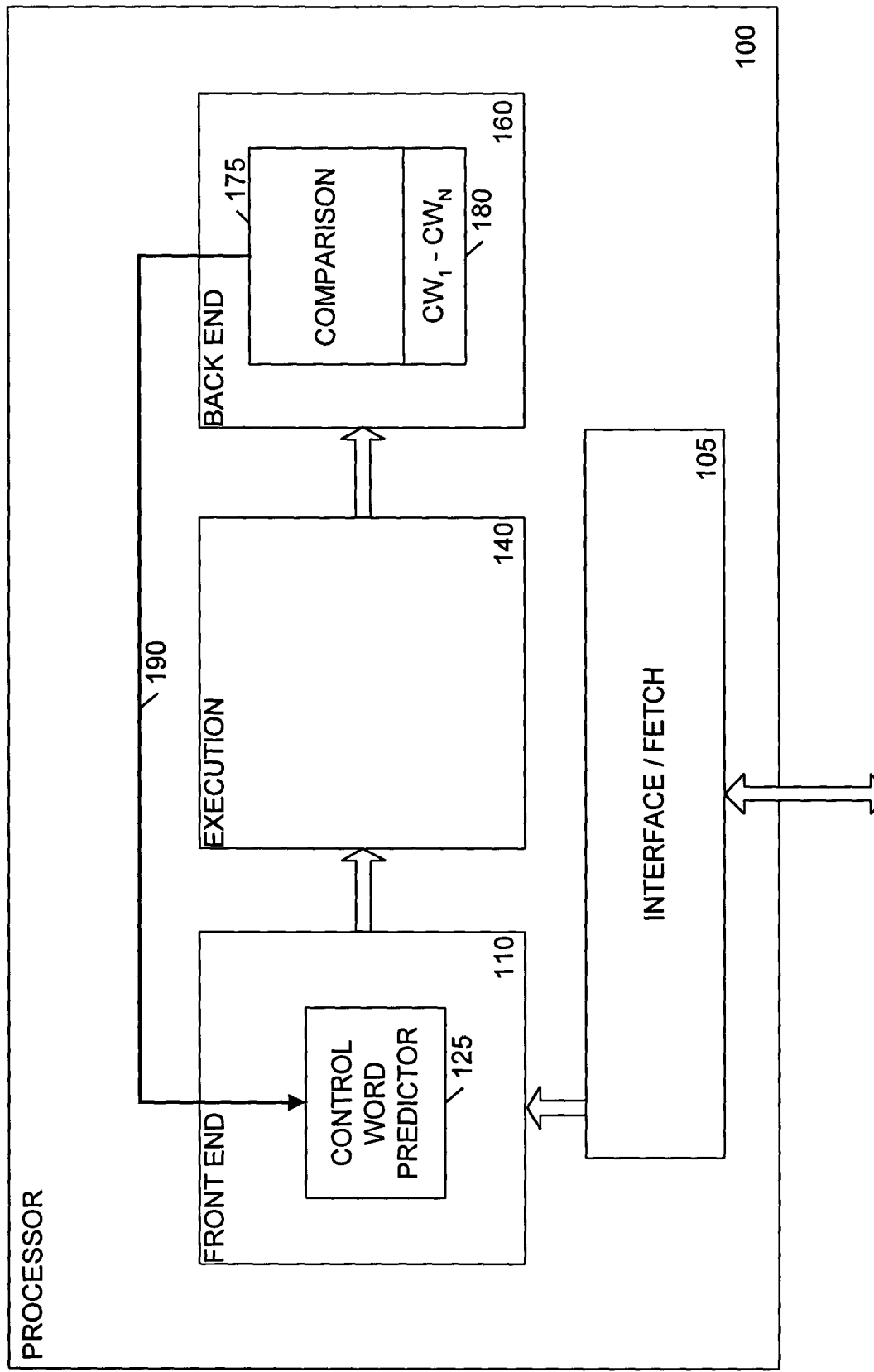
FIG. 1 illustrates one embodiment of a processor utilizing prediction for control registers.

In the embodiment of FIG. 1, a processor 100 is illustrated, including front end resources 110, execution resources 140, and back end resources 160. Generally, instructions or operations are retrieved from a memory resource (not shown) via interface and fetching logic 105 and processed by the front end resources 110, then the execution resources 140, and then the back end resources 160.

The execution, front end, and back end resources may include hardware resources that may be integrated into a single component or integrated circuit in some embodiments. However, the resources may include software or firmware resources or any combination of hardware and software and/or firmware that may also be used in execution of program instructions. For example, firmware may be used as a part of an abstraction layer or may add functions to processing hardware, as may software. Software also may be used to emulate part or all of an instruction set, to translate instruction sets, or to otherwise assist in processing.

The processor may be any of a variety of different types of processors that execute instructions. For example, the processor may be a general purpose processor such as a processor in the Pentium® Processor Family or the Itanium® Processor Family or other processor families from Intel Corporation or other processors from other companies. Thus, the processor may be a reduced instruction set computing (RISC) processor, a complex instruction set computing (CISC) processor, a very long instruction word (VLIW) processor, or any hybrid or alternative processor type. Moreover, special purpose processors such as network or communication processors, co-processors, embedded processors, compression engines, graphics processors, etc., may use disclosed techniques. As integration trends continue and processors become even more complex, the need to perform speculative execution may further increase, thus making presently disclosed techniques more desirable. However, due to rapid technological advance in this area of technology, it is difficult to foresee all the applications of disclosed technology, though they may be widespread for complex hardware that executes program sequences.

Figure 2:
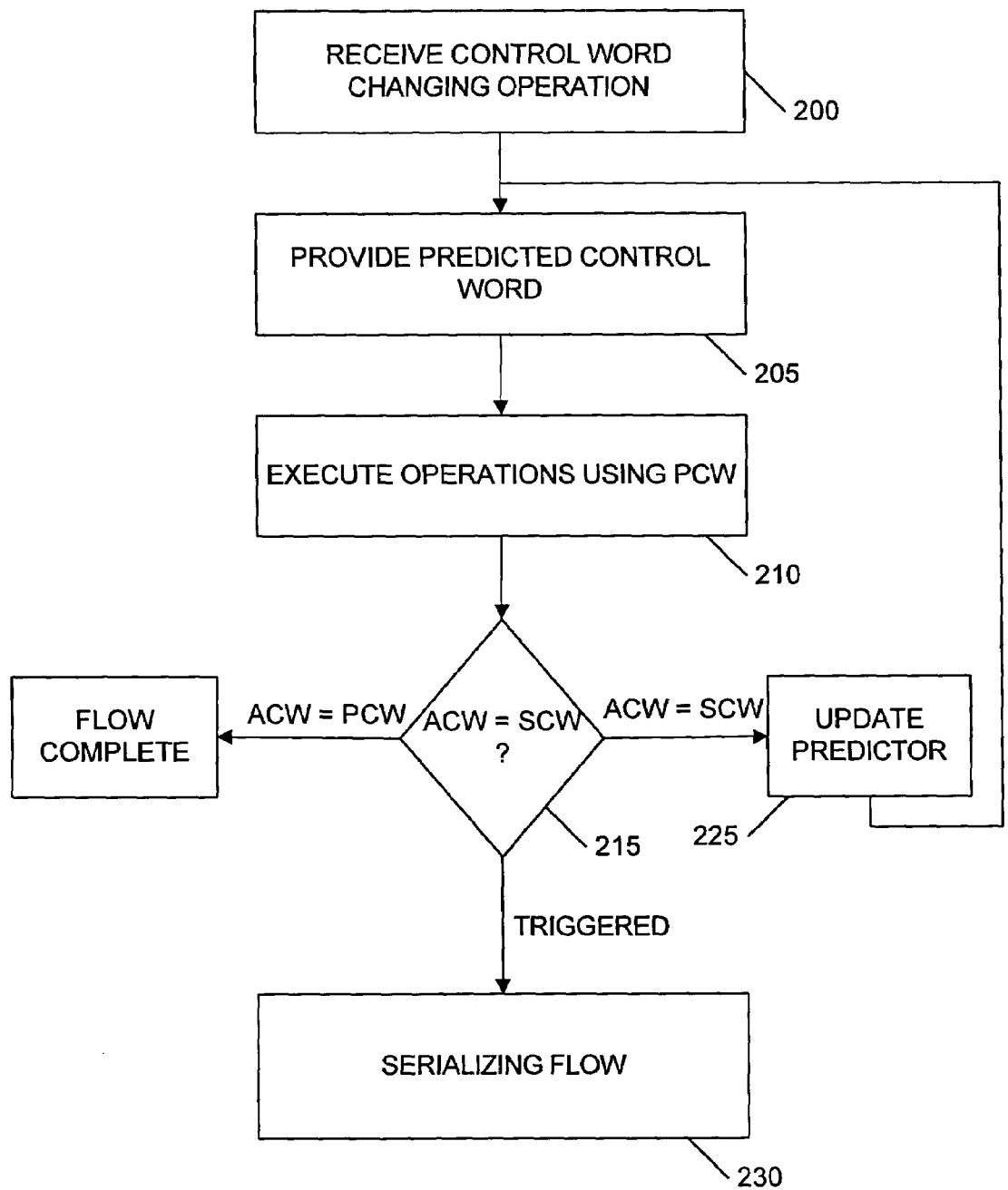
FIG. 2 illustrates one embodiment of a method for control register prediction and recovery.

In the embodiment of FIG. 1, the front end resources 110 include a control word predictor 125. Operation in one embodiment may proceed as illustrated in the flow diagram of FIG. 2. As indicated in block 200, a control word changing operation may be received. The control word predictor 125 generates or provides a prediction of a new control word in response to the control word changing operation as indicated in block 210. In one embodiment, a table of past values indexed by an instruction pointer (IP) value (or a portion or a function thereof) may be accessed to provide the prediction. Predictors are often used for branches, and any of a great variety of prediction techniques used in the art of branch prediction may be employed in alternative embodiments. For example, various hashes, multiple level and/or multiple-bit biasing or predictive techniques may be used.

As indicated in block 210, with a predicted control word chosen, operations are executed using the predicted control (PCW) by the execution resources 140 in the embodiment of FIG. 1. In one embodiment, the operations executed using the predicted control word are subsequent in a program sequence to the control word changing instruction. These instructions are considered to be speculatively executed because whether or not they will be retired to machine state is uncertain (until the speculation is resolved). Additionally, the execution resources may allow out-of-order execution. The front end resources 110 may handle scheduling and the processor may contain circuitry such as ordering buffers and the like to properly retire instructions executed out of order to the proper machine state.

In block 215, the actual control word has been resolved, and is tested against the stored control words, including the predicted control word. In the back end resources 160 of FIG. 1, such comparison may be accomplished by comparison logic 175, which compares a set of stored values 180 against the predicted control word. If the predicted control word equals the actual control word, then the flow completes as indicated in block 220. If the actual control word is one of the set of stored control words (SCW), which may be recently used control words or otherwise loaded control word candidates, but does not also match the predicted control word, then the predictor 125 is updated in block 225. In the embodiment of FIG. 1, the predictor may be updated by signaling from the back end resources 160, and particularly the comparison logic 180, to the front end resources 110 via a signal interface 190. Such signaling may be accomplished by sending a signal or dispatching an instruction to update a predictor value. After block 225, operations return to block 205, where a prediction is generated and execution of the operations again occurs. This time, however, since the predictor 125 was updated to predict the actual value, then execution will lead to block 220 where the flow completes.

As will be further discussed below, in some embodiments, the virtual match capability, the ability to match one of a set of stored candidate control words, may allow a small, branch mispredict type penalty to be incurred when a virtual match occurs. Such branch mispredict penalties usually are substantially smaller than the overhead of fully serializing an instruction.

In the case of no match occurring in block 215, then the results of the operations executed using the predicted control word are flushed from the processor and a serializing flow is initiated to ensure the proper control word is properly loaded for execution of subsequent instructions. For example, the serializing flow may involve setting and checking scoreboard entry/entries and/or ensuring that all instructions programmatically subsequent to the control word changing instructions are complete before the control word changing instruction is executed and that all instructions subsequent to the control word changing instruction are executed after completion of the control word changing instruction. The serializing flow may also update the stored control word values 180 and the control word predictor 125.

Figure 3A:
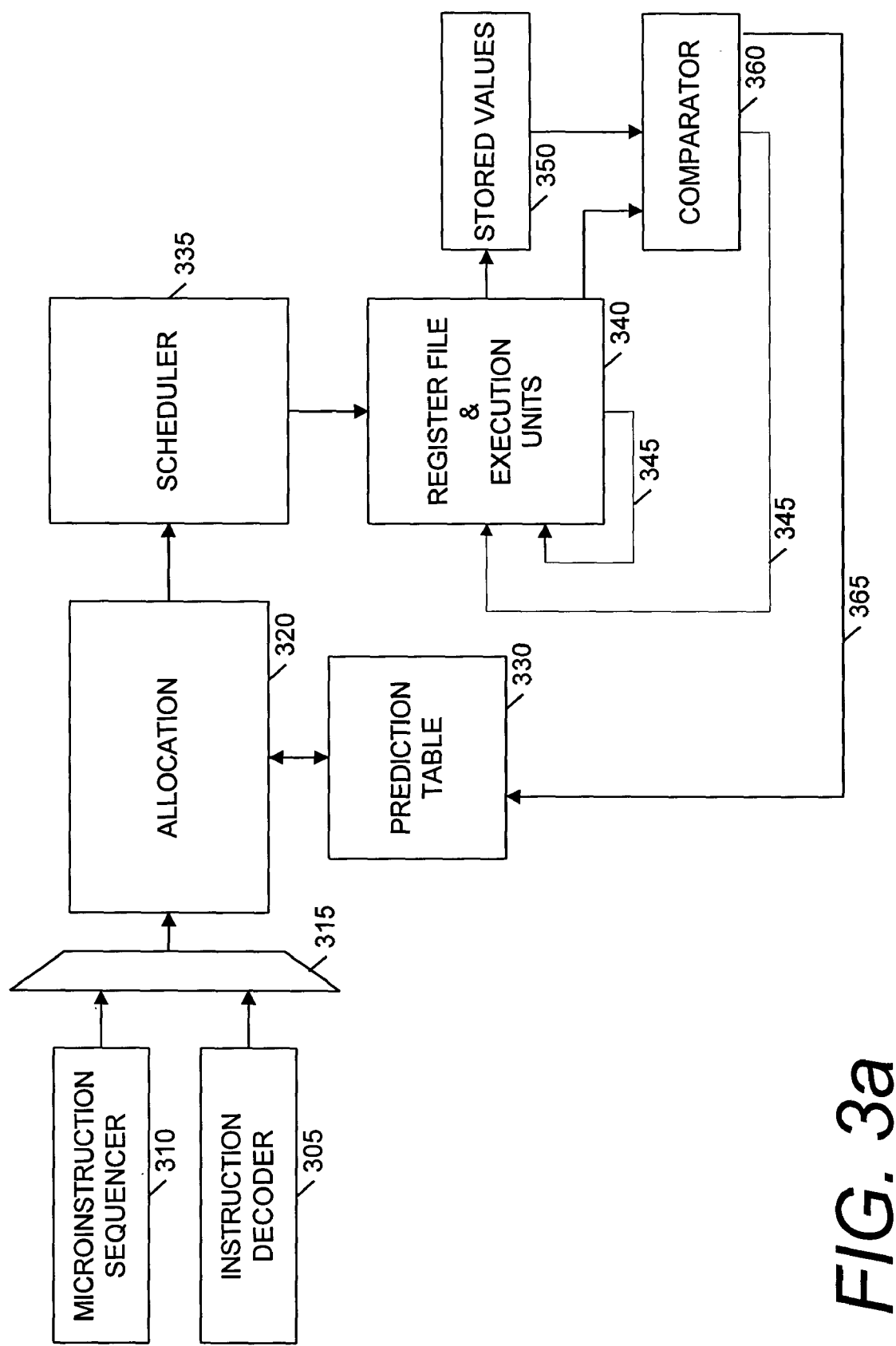
FIG. 3a illustrates another embodiment of a processor utilizing prediction for control registers.

FIG. 3a illustrates another embodiment of a processor utilizing control word prediction. The embodiment of FIG. 3a includes an instruction decoder 305 which receives instructions (e.g., macroinstructions) fetched from a memory source. The instruction decoder 305 may decode the macroinstructions into one or more microinstructions and/or may trigger a microinstruction sequencer 310, which is coupled to the instruction decoder 305, to issue a series of microinstructions or microoperations (uOPs) and/or other control signals. A selector 315, which is coupled to receive inputs from the microinstruction sequencer 310 and the instruction decoder 305, provides microoperations from these sources to the allocation module 320.

Figure 3B:
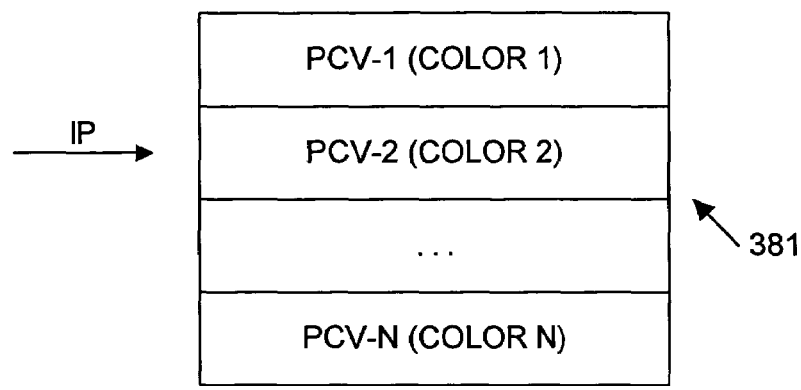
FIG. 3b illustrates a table to map instruction pointer values to predicted control values and associated colors according to one embodiment.

The allocation module 320 allocates resources for instructions to execute. The allocation module 320 may allocate registers from a register renaming resource to allow execution of the various instructions. Additionally, the allocation module 320 may "color" various microoperations as they progress to a scheduler 335, and may track their speculative execution progress. The allocation module 320 colors sets of microoperations based on their dependencies. A set of microoperations are tagged (e.g., one or more bits of a dedicated field or of another pre-existing field are used encode different "colors") based on its point of speculation. For example, if a branch is encountered, for which a prediction has been made, instructions subsequent to the branch are colored differently than those before, so misprediction recovery may be accomplished. Similarly, in the case of control word prediction and speculation, instructions after a control word change prediction are colored differently than those before the predicted control word change to allow recovery if the prediction is incorrect. In the embodiment of FIG. 3a, a prediction table 330 is shown. In one embodiment, shown in FIG. 3b, the instruction pointer value is used to index into a table 381 where each of a set of N predicted control values (PCV-1 through PCV-N) are stored and a color is associated therewith.

Changing the color of instructions after the control word changing instruction may be accomplished by inserting a branch uOP into the flow. The branch uOP may be a conditional branch, which may be conditional on whether the actual and predicted control word values match (e.g., a branch not equal type branch). The branch may be predicted to indicate that the control word prediction was correct (i.e., that the predicted value equals the actual value). If the branch and hence control word prediction turns out to be incorrect, then the control word effectively causes or amounts to a branch misprediction. Thus, clearing the control word misprediction may be performed naturally according to the processor branch misprediction flow, assuming the predictor is also updated (e.g., by a set uOP) to correctly predict the previously mispredicted control word when the flow is re-executed.

The register file and execution units 340 are coupled to the scheduler 375 to receive and execute instructions. For example, the execution units may include integer execution units, floating point execution units, memory execution units, single instruction multiple data (SIMD) execution units and/or multi-purpose execution units that combine multiple different types of operations (e.g., SIMD and floating point and/or integer).

The register file and execution units 340 are also coupled to a storage element 350 to store frequently used control values. The frequently used control values may be recently used control values in some embodiments where such values are stored in the storage element 350 when they are encountered and loaded during program execution. In other embodiments, the storage element may be loadable through various means. For example, machine specific registers may be written to and/or specific and/or dedicated instructions may be executed to store values in the storage element 350.

A comparator 360 is coupled to the storage element 350 to compare a loaded value received from an execution unit to the value that is predicted. The comparator 360 receives the color designation from the predicting microinstruction and indexes into the storage element to determine if a match from the loaded value to the appropriate color value has occurred. For example, in one embodiment, the control values may be stored in the storage element 350 by their color number. The color may access the appropriate entry of the storage element 350 to determine if a match of the predicted control word to the actual (loaded) control word occurs. However, the comparator 350 also compares the actual control word to all of the valid control values stored in the storage element 350. Such comparison may be done in parallel in one embodiment to expedite processing. Thus, the comparator 360 determines if a match occurs or a virtual match occurs (i.e., the actual control word is not the predicted control word but is one of the other stored control words). In one embodiment, the stored control words are the control words that have been most recently used for each table entry or color.

Figure 4:
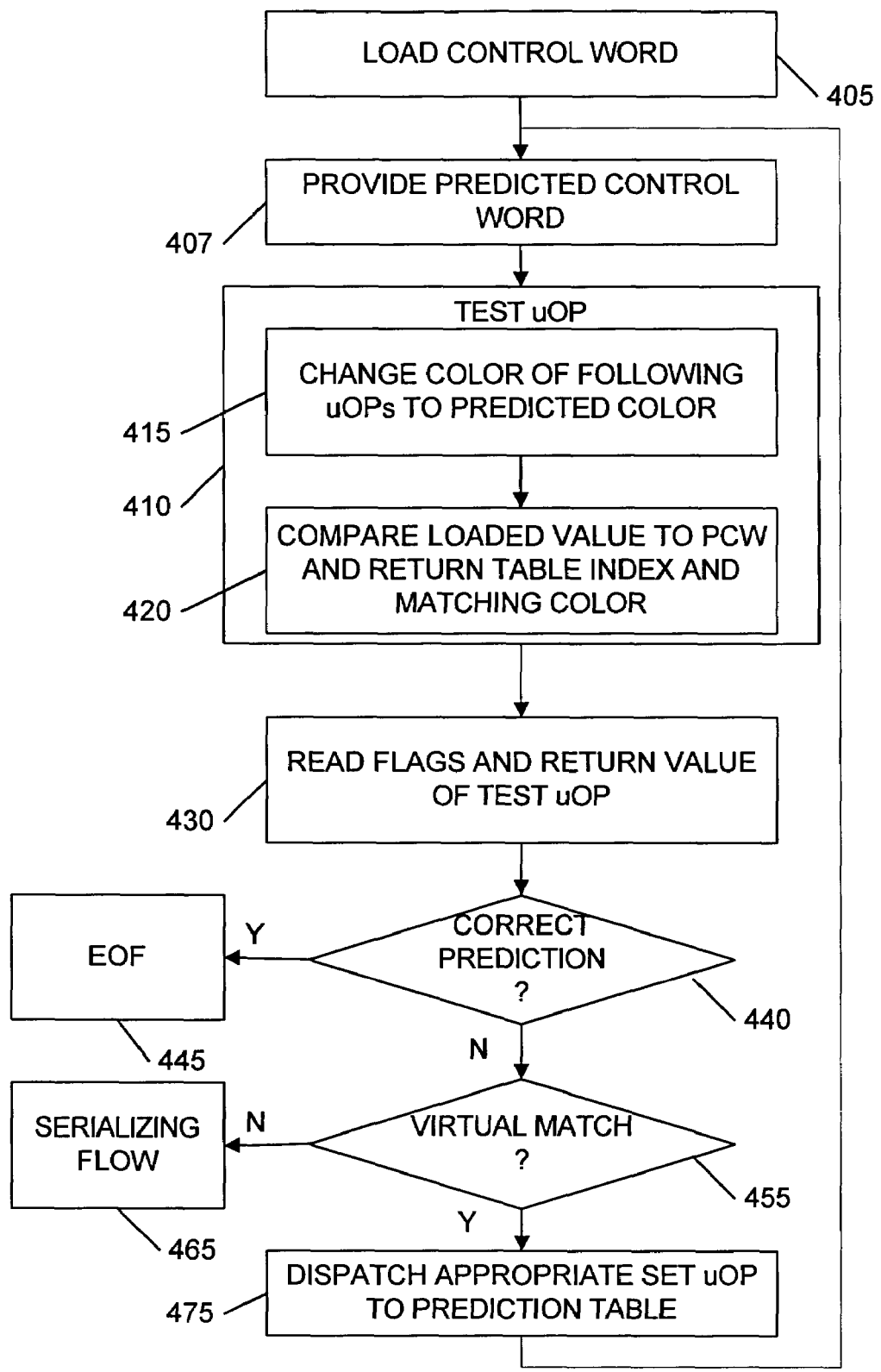

Further details of the operation of the embodiment of the processor of FIG. 3a may be appreciated from the sequence of operations shown in FIG. 4. It is assumed that a control word changing instruction (e.g., a FLDCW macroinstruction) is received and a set of instructions subsequent to that instruction may start execution while the load is being completed. In block 405, a load control word operation (e.g., uOP) is dispatched by the instruction decoder or the microinstruction sequencer in response to the control word changing instruction. Also, responsive to the control word changing instruction, a predicted control word (PCW) is generated as indicated in block 407. Thus, for example, the instruction pointer value (or a subset of IP bits) may index into the prediction table 330 to obtain the predicted control word.

As indicated in block 410, a test uOP is dispatched. The test uOP changes the color of the following uOPs to the predicted color associated with the predicted control word as indicated in block 415. Additionally, the test uOP compares the loaded (actual) control word value to the predicted value and returns the table index and matching color as indicated in block 420, of course once the actual value has been loaded. The values of the flags from this comparison and the return value of the test uOP are read as indicated in block 430, and different actions are taken based on the result as indicated in block 440.

If a correct prediction has occurred, then the speculation was correct, and the end of the instruction is reached in block 445. If the prediction was not correct, then whether a virtual match occurs is determined in block 450. As previously mentioned, it may be advantageous to perform comparisons of the actual control word to all stored control words in the same clock cycle or roughly simultaneously. Therefore blocks such as blocks 440 and 450, among others, are only shown here sequentially for illustrative purposes. A virtual match occurs in block 450 if any of the stored control values in the storage element 350 match the actual control word, but the predicted control word did not. If a virtual match occurs, then a set uOP is dispatched to update (set) the appropriate entry in the prediction table 330 to the correct (actual) control value, so that re-execution will cause the prediction to be correct. In one embodiment, the value of the color of the correct control word is used to jump into a series of different set commands in the microcode or a jump array to invoke the proper set command to change the correct entry in the prediction table 335.

After the set uOP has been dispatched, the instructions subsequent to the control word changing instruction may be re-executed. In this re-execution stage, the instructions should execute correctly because the control word will be correctly predicted. The technique of updating the front end predictor and re-executing the same instruction flow allows a branch prediction type of technique to be used to clear out the incorrect speculation. Such clearing is substantially quicker for most processors than full serialization or a higher level of serialization as may be required to fully update a control word value.

For example, in the case where there was no direct match or virtual match in blocks 440 and 450, a serialization flow is used to update to the proper control word and clear the machine of any misspeculation. However, by the use of virtual prediction and a number of possible values in the storage element 350, serialization can be avoided in many cases. In many computer programs, there is a tendency to only use a limited set of control words and to switch between such set. Therefore a relatively small storage element (e.g., four, eight, etc.) may provide a very high percentage of correctly predicted control word values. As such, a longer serialization flow may be avoided a high percentage of the time in some embodiments once the storage element 350 is properly loaded.

Figure 3C:
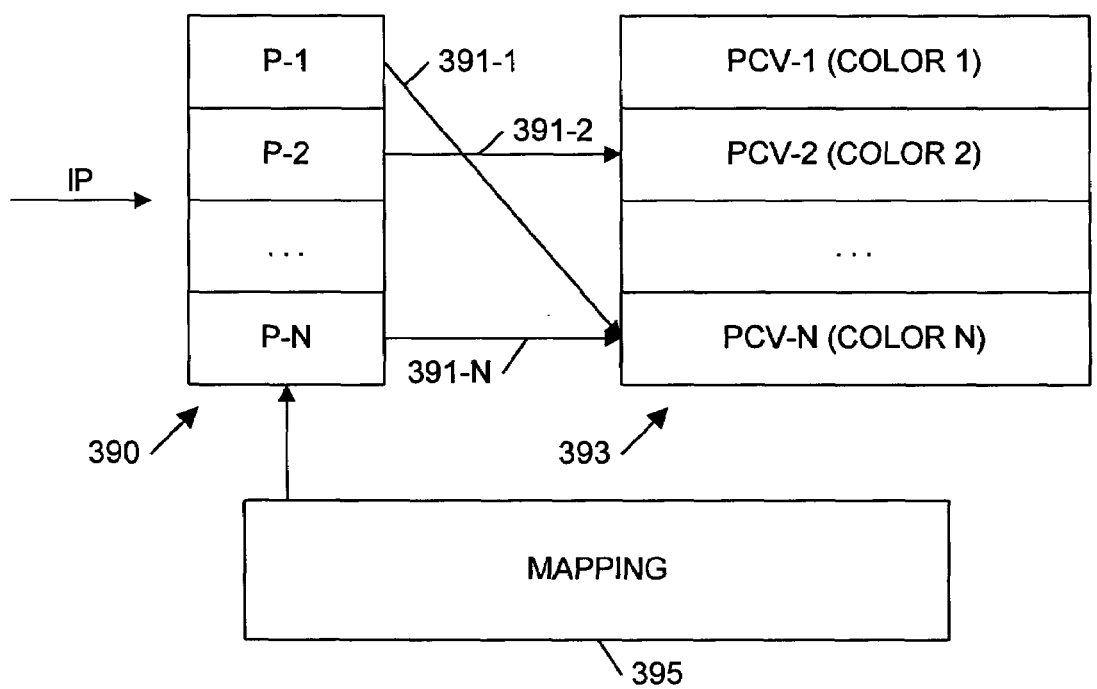
FIG. 3c illustrates an embodiment using pointers to map instruction pointer values to predicted values.

FIG. 3c illustrates an alternative embodiment for the prediction table 330 of FIG. 3a. In the embodiment of FIG. 3c, pointer values map instruction pointer values to predicted values. The embodiment of FIG. 3c includes a table 393 similar to that of FIG. 3b in that the table 393 stores a set of N predicted control values (PCV-1 through PCV-N) and/or an associated color for each. The embodiment of FIG. 3c also includes a pointer table 390 and mapping logic 395. This embodiment allows the preservation of more potential virtual matches.

The instruction pointer is used to index into the pointer table 390. The respective pointer table entry stores a pointer or a value indicating one of the entries in the table 393, and the associated prediction of the control value from the table 393 is used as previously described. In the event that a prediction is incorrect, a pointer may be changed rather than necessarily changing a prediction value.

For example, if a previously used control value is detected, the mapping logic 395 can write to the pointer table so that subsequent iterations to that instruction pointer reference a different entry in the table 393 containing the correct prediction, rather than duplicating entries in the table that have the same prediction associated with different instruction pointer values. Maintaining a larger number of differing prediction values allows more potential virtual matches, which advantageously can reduce latency when compared to the complete mismatch case. Of course, if new control values are detected, the mapping logic 395 may write new values to the table 393 as well.

In the example shown in FIG. 3c, a first pointer (P-1) points to an Nth predicted control value (Nth color) as indicated by arrow 391-1. A second pointer points to a second predicted control value as indicated by arrow 391-2, and various other pointers may point to other values in the table 393, including the Nth pointer, which is shown pointing to the Nth predicted control value (Nth) color, as indicated by arrow 391-N. Thus, multiple pointers can point to the same predicted value to facilitate better prediction as well as the maintenance of more potential virtual match values.

Figure 5:
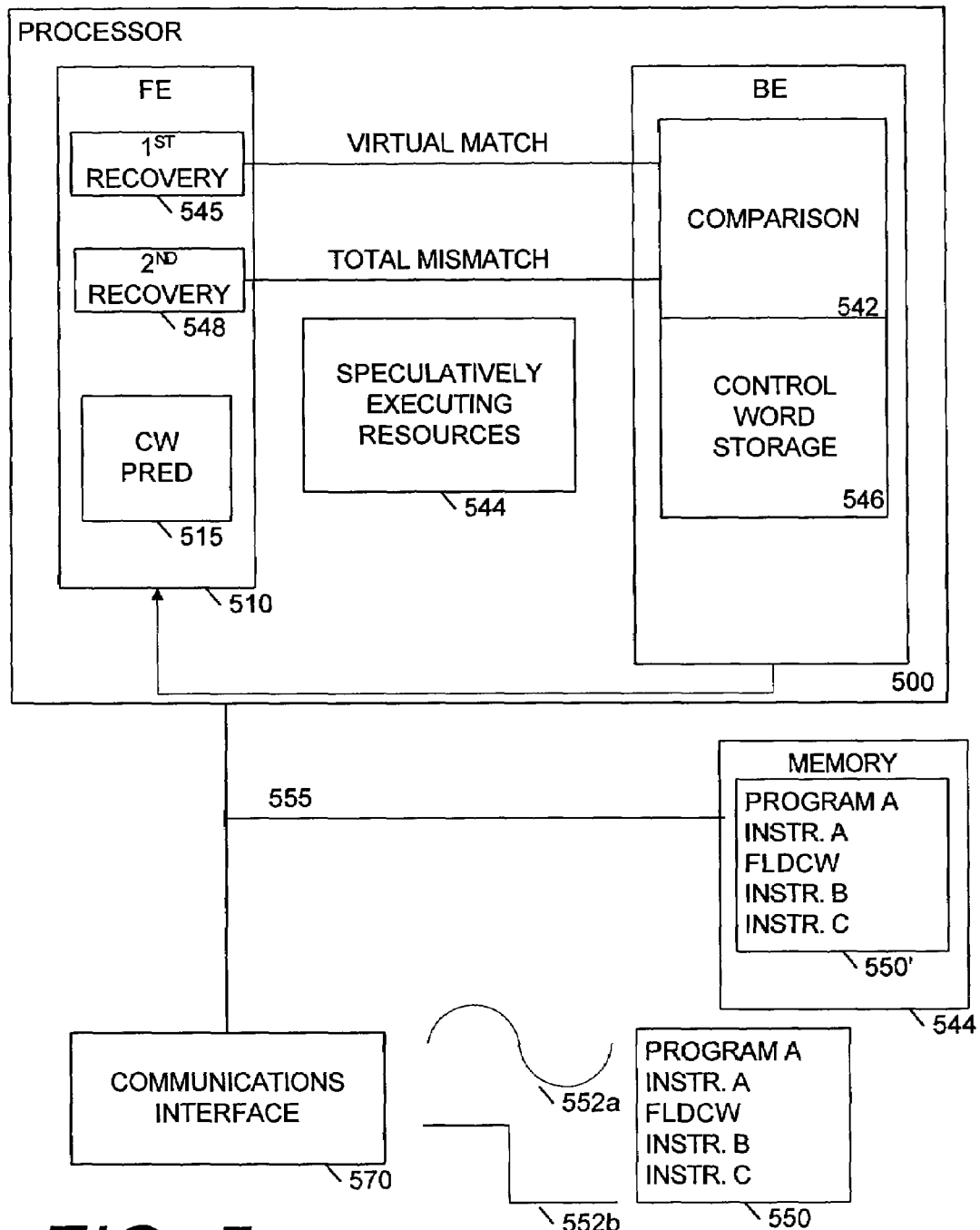
FIG. 5 illustrates one embodiment of a system including a processor utilizing a disclosed control word prediction technique.

FIG. 5 illustrates one embodiment of a system utilizing a processor 500 that performs control word prediction. In the embodiment of FIG. 5, the processor 500 is coupled to a memory 544 and a communications interface 570 via a coupling 555. The coupling 555 may involve various bridges, interfaces, buses, point-to-point connections and the like, or may be a direct connection. In any case, the processor 500 is capable of communicating (transferring data to and/or from) the memory 544 and the communications interface 570.

The processor 500 of FIG. 5 includes a front end module 510, a speculative execution module 520, and a back end module 540, among other things typically included in microprocessors. The back end module 540 includes a comparison module 542 coupled to a control word storage module 546. The comparison module 542 is coupled to communicate with a first recovery mechanism 545 and a second recovery mechanism 548. The comparison module 542 signals the first recovery mechanism 545 in response to a virtual match, which occurs if an actual loaded control word matches one of a set of stored control words but mismatches the predicted control word. The first recovery mechanism 545 recovers from this situation by updating the control word predictor 515 and re-executing the instructions after the control word changing instruction.

The comparison module 542 also signals the second recovery mechanism 548 if a total mismatch occurs. The second recovery mechanism 548 that is activated by the total mismatch module recovery mechanism in response to a total mismatch may cause a different recovery than a virtual mismatch. In the case of a total mismatch, there may be no value stored in the control word storage 546 that could match the actual control word. Therefore, in some embodiments, both the control word storage 546 and the control word predictor 515 may be updated. Additional serialization steps including the use of a scoreboard to achieve serial operation. Additionally, in the case of an out-of-order processor, serialization may require a draining of active instructions from the execution units (and possibly full retirement thereof) prior to dispatch of the control word changing instruction. For example, if program A 550' is executed from the memory 544, then instruction A may be forced to retire prior to the FLDCW and instructions B and C may commence execution. Various different degrees of serialization may be required depending on the particular processor implementation, as will be appreciated by one of skill in the art.

The recovery mechanisms may be implemented in a variety of different manners according to design choice. For example, each recovery mechanism may be a portion of a microcode flow or flow from a micro-operation sequence generator that generates uOPs executed by the execution resources. In one embodiment, the color of the correct (actual) control word may index into a set of jump instructions to cause a jump to a proper set uOP which corrects the control word predictor 515 in the case of a virtual mismatch. In other cases, function calls, routines, hard wired control logic, and various other techniques may be used to provide the different recovery functionalities.

In the embodiment of FIG. 5, program A 550 is also shown as being transmitted via a machine readable media, carrier media 552a or 552b. For example, the program may be downloaded via the communications interface 570 and then stored into the memory 544 prior to execution. The carrier media may be a network or communications interface that is capable of receiving signals carrying information. The signals may be transmitted by electromagnetic waves through air or another medium (e.g., fiber, wire, etc.). The encoding of the information may be analog or digital in different embodiments. The program may also be stored on a machine readable medium such as a optical or magnetic disk or any other type of volatile or non-volatile memory in a memory hierarchy in some embodiments (e.g., as memory 544).

Also, the various processor components (e.g., front end module, execution module, back end module) are referred to as modules (and previously as resources) as they may be implemented in various different manners depending on design choices. For example, a processor implementing disclosed techniques may implement various resources or modules in hardware (i.e., fabricated on a single integrated circuit or the like) or may use software, firmware, and/or some combination of software, hardware and firmware to implement the functionality of various modules and/or resources.

Furthermore, the processor itself, in the case of an integrated circuit design choice, goes through various stages of design and manufacture. During development, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or retransmission of the electrical signal is performed, a new copy is made. Thus, a communication provider or a network provider may make copies of an article (a carrier wave) embodying techniques of the present invention.

Thus, techniques for virtual prediction for control registers in a speculatively executing machine are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a control word predictor to predict a predicted control word for execution of a plurality of operations in response to a control word changing operation;
execution resources to speculatively execute the plurality of operations utilizing the predicted control word;
a comparison module to determine if an actual control word matches the predicted control word set by the control word changing operation or a plurality of other control words stored in a storage element, and to cause re-execution of said plurality of operations if said actual control word matches any of the plurality of other control words.

2. The apparatus of claim 1 wherein a match by said comparison module to any of the plurality of other control words causes re-execution of said plurality of operations substantially according to a branch misprediction process.

3. The apparatus of claim 2 wherein a mismatch of the actual control word to all the plurality of other control words and the predicted control word causes a serialization process substantially more time consuming than said branch misprediction process.

4. The apparatus of claim 3 wherein said control word predictor comprises a prediction table.

5. The apparatus of claim 1 further comprising:
means for adjusting the control word predictor to predict the actual control word during re-execution of said plurality of operations.

6. The apparatus of claim 1 wherein said control word predictor comprises a prediction table, wherein said apparatus further comprises a microsequencer to dispatch a set operation to change an entry in said prediction table if said actual control word matches any of the plurality of other control words.

7. The apparatus of claim 1 further comprising:
a microsequencer to generate one or more first operations in response to said control word changing operation, the one or more first operations to provide a conditional branch based on whether or not the predicted control word matches the actual control word, and wherein said microsequencer is to generate a second operation if the predicted control word does not match the actual control word but matches one of the plurality of other control words, said second operation to alter a prediction of the control word predictor.

8. The apparatus of claim 6 wherein said actual control word is a floating point control word, and wherein said one or more first operations and said second operation are microoperations, and further wherein said control word changing operation is a load floating point control word macroinstruction.

9. The apparatus of claim 1 wherein processor comprises data embodied on a machine readable medium.

10. A method comprising:
generating a predicted control word in response to a control word changing operation;
executing a plurality of operations using the predicted control word;
testing whether an actual control word matches said predicted control word or one of a plurality of other control words stored in a storage element;
updating a prediction if the actual control word matches one of the plurality of other control words; and
re-executing said plurality of operations if the predicted control word matches one of the plurality of other control words.

11. The apparatus of claim 1, wherein the plurality of other control words are stored in a storage element.

12. The method of claim 10 further comprising:
treating said plurality of operations as a plurality of dependent instructions on a mispredicted branch if the predicted control word matches one of the plurality of other control words.

13. The method of claim 10 further comprising:
selecting the predicted control word from a prediction table from a table location based on an instruction pointer to generate the predicted control word;
speculatively executing a plurality of operations with said predicted control word after selecting the predicted control word from the prediction table.

14. The method of claim 13 wherein selecting comprises tagging a microoperation with a table entry number indicative of which control word is selected from the prediction table.

15. The method of claim 14 wherein updating the prediction comprises:
generating a set microoperation to set the table location to indicate the actual control word.

16. The method of claim 15 further comprising:
performing a serializing flow if the actual control word mismatches both the plurality of other control words and the predicted control word.

17. The method of claim 10 wherein said control word changing operation comprises a load floating point control word instruction, the method further comprising:
decoding the load floating point control word instruction to generate a test microoperation and optionally a set operation to update the prediction if the actual control word matches one of the plurality of other control words.

18. A system comprising:
a memory to store a control word changing instruction and a plurality of programmatically subsequent instructions;
a processor including control word prediction logic, said processor to predict a predicted control word in response to said control word changing instruction and to speculatively execute said plurality of programmatically subsequent instructions, said processor using a first recovery mechanism if a later determined actual control word mismatches the predicted control word but matches one of a plurality of stored control words stored in a storage element, and using a second recovery mechanism if said later determined actual control word mismatches the predicted control word and the plurality of stored control words.

19. The system of claim 18 further comprising:
a communications interface.

20. The system of claim 19 wherein said control word changing instruction is downloaded via the communications interface prior to execution by the processor.

21. The system of claim 20 wherein the first recovery mechanism utilizes a branch misprediction recovery technique and said second recovery mechanism utilizes a serialization technique.

22. The system of claim 18 wherein first recovery mechanism utilizes a branch misprediction recovery technique and said second recovery mechanism utilizes a serialization technique.

23. The system of claim 18, wherein the plurality of other control words are stored in a control word storage.

24. A processor comprising:
a front end instruction decoder to decode a control word changing instruction;
control word prediction logic to provide a predicted control word in response to said control word changing instruction;
allocation logic to allocate register resources and to generate colors for instructions, said allocation logic to cause a color change for a plurality of instructions subsequent to said control word changing instruction;
scheduling logic to schedule execution of said plurality of instructions subsequent to said control word changing instruction;
execution logic coupled to said scheduling logic to speculatively execute said plurality of instructions subsequent to said control word changing instruction using said predicted control word;
comparison logic to compare an actual control word to said predicted control word and to a plurality of control words, if said actual control word matches one of the plurality of control words, said comparison logic to signal said control word prediction logic and to trigger re-execution of said plurality of instructions subsequent to said control word changing instruction using said predicted control word.

25. The processor of claim 24 further comprising a microinstruction sequencer, wherein said microinstruction sequencer generates:
a test microinstruction to test whether the actual control word matches the predicted control word;
a set microinstruction to update a prediction in the control word prediction logic if said actual control word matches one of the plurality of control words.

26. The processor of claim 25 wherein said microinstruction sequencer further generates, if the actual control word mismatches the plurality of control words:
a serializing microinstruction flow if said actual control word mismatches all of said plurality of control words.

* * * * *